Oct. 11, 1938. L. E. W. MONTROSE-OSTER 2,132,960
ELECTRIC REMOTE SELECTOR CIRCUIT
Filed April 23, 1937
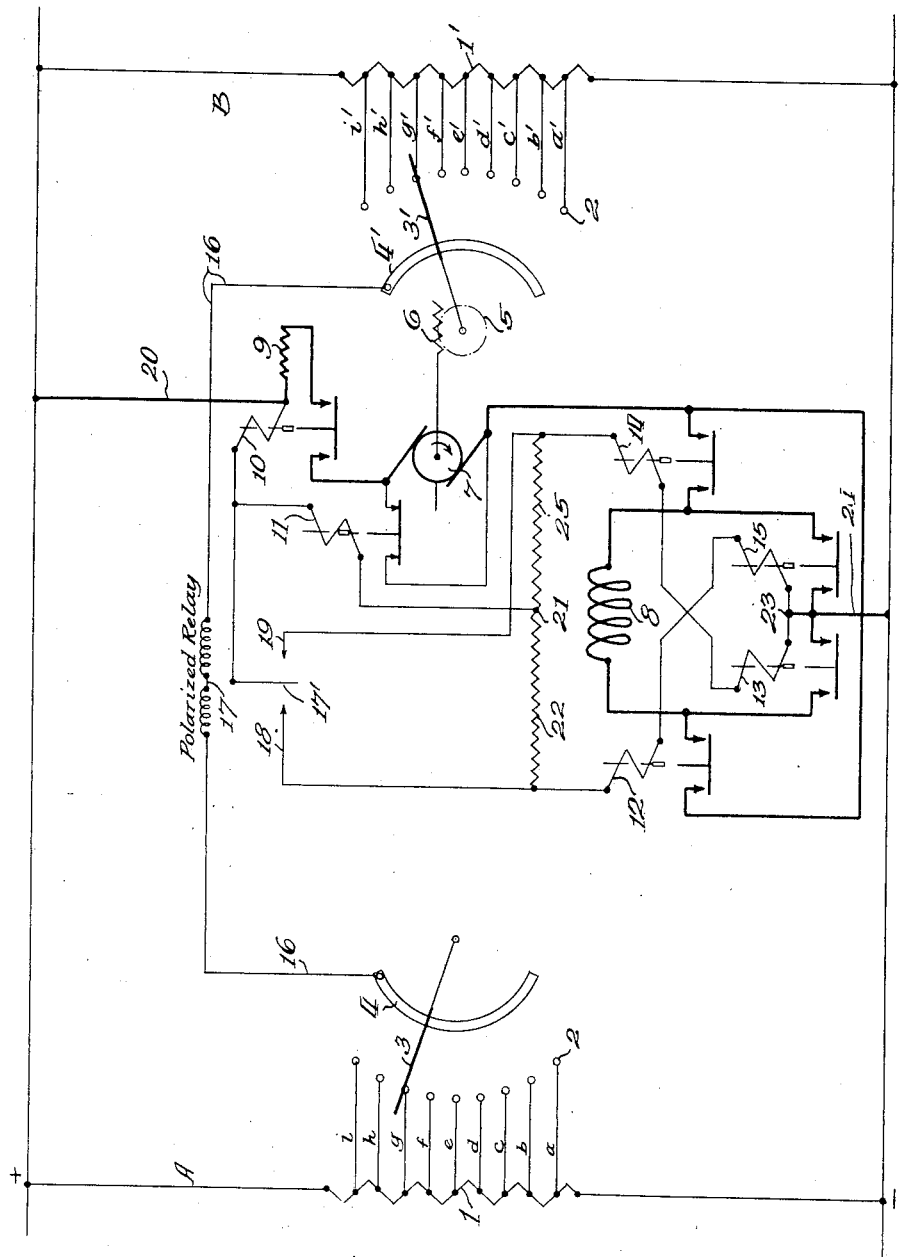
Inventor:
L. E. W. Montrose-Oster
By Williams, Bradbury, McCabe & Hinkle
Attys Patented Oct. 11, 1938

2,132,960

UNITED STATES PATENT OFFICE 2,132,960

ELECTRIC REMOTE SELECTOR CIRCUIT

Louis Eugène Widolt Montrose-Oster, Carlsbad, Czechoslovakia, assignor of one-half to Pollopas Patents, Ltd., London, England Application April 23, 1937, Serial No. 138,608 In Germany May 6, 1933

2 Claims. (Cl. 172—239)

The invention relates to an electric remote selective control system with congruently sub-divided potentiometers at the transmitter and at the receiver, the tappings of which are connected to contact paths with a preferably resilient contact arrangement, and a compensating line arranged between the tappings which comprises a switching means for a controlling device of the driving motor at the receiver, and with devices for consuming the kinetic energy of the moving parts of the receiver, which become effective as soon as the parts of the receiver have reached one of the positions predetermined on their contact path and respectively controlled by the transmitter, use being made of a plurality of different relays for controlling the driving motor of the receiver.

Such a circuit will hereinafter be referred to as "of the kind described".

In similar remote selector circuits, it has already been proposed to use motors of special construction. Part of the tapped exciting winding of such a motor is continuously traversed by the current, so that the permanently existing field, on short-circuiting of the armature, almost instantaneously stops the motor.

Furthermore, it has already been proposed to stop a motor in a remote control system with polyphase current and polyphase potentiometers and synchronous motors by shortcircuiting the armature, but with a field constantly excited by the mains supply.

Experience has shown that in the known arrangements, sufficiently great accuracy of the adjustment cannot be achieved. The control motor, for instance, often switches one step too far and begins to hunt on returning to the correct position.

The invention allows the exact observance of the adjustments at the receiver in a system of the kind described, by providing a relay connection of a novel nature which stops the controlling motor instantaneously as soon as the movable contact of the receiver has reached a point corresponding to the position of the movable contact of the transmitter.

According to the invention, this is effected by providing different timing of the electro-magnet relays in such a manner that, on switching-off the switching means in the compensating line, those relays which switch the current to the driving motor connected to the mains voltage in series with a resistance open only after the short-circuiting relay of the motor armature has responded and short-circuited the armature of the driving motor.

The driving motor preferably has only one non-subdivided field winding, and the field is strengthened simultaneously with the short-circuiting of the armature.

The accompanying drawing illustrates, as a constructional example, a diagram of this new circuit for the particular case of feeding with direct current. It is shown in detail in order to make the invention particularly clear.

Referring to the drawing, 1 and 1' denote two identical potentiometers, one of which is installed at the transmitter A and the other at the receiver B. Each potentiometer is sub-divided into a number of steps $a$ to $i$ and $a'$ to $i'$ respectively, which are connected to a contact path 2 and 2' respectively arranged at A and B. The lever 3 can slide on the contact path at A and the lever 3' on the contact path at B. Through these levers, the voltage derived is transmitted to the inner rings 4 and 4' respectively. The arrangement 1 to 4 therefore represents the transmitter and the arrangement 1' to 4' the receiver.

While the lever 3 can be adjusted, e. g., by hand, at will to one of the contacts $a$ to $i$ of the path 2, the contact lever 3' of the contact path 2' is moved, for instance, through a worm wheel 5 and a worm 6 from an electric motor, the armature and field winding of which are denoted by 7 and 8 respectively.

A series-wound motor has been chosen for the example.

This motor is connected in series with a series resistance 9 to the mains supply. The supply leads to the positive and negative pole are passed through different relays, which are successively denoted by 10, 11, 12, 13, 14 and 15. In the compensating line 16 between the contact path 4 of the movable contact 3 of the transmitter and the contact path 4' of the movable contact 3' of the receiver, a polarized change-over relay 17 of well-known type is provided which makes contact by its movable contact tongue 17' either at 18 or 19, according to the direction of the current flowing in the compensating line 16. The circuit connection of the six relays 10 to 15 is provided in the present case, for example, in star form, so that the current which flows from the positive conductor through the lead 20 the coils of the relays 10 and 11, then divides at the point 21, one half thereof flowing through the series resistance 22, the coils of the relays 12 and 15, the junction 23 and the lead 24 to the negative conductor, the other half flowing through the equally large series resistance 25, the coils of the relays 14, 13, the junction 23 and the lead 24 to the negative conductor. The relay coils are given such dimensions that although they may be permanently connected to the mains voltage, the closed-circuit current can only attract the armature of the relay 11, by which the armature 7 of the main current motor is short-circuited. In the case of the other five relays 10, 12, 13, 14, 15, the closed-circuit current is unable to attract the armatures.

In the condition shown (condition of rest), therefore, only the relay 11 has attracted its armature, whereby the armature 7 of the control motor is short-circuited. No current flows in the connecting line 16 between the members 4 and 4', since they are connected through the contact levers 3 and 3' to the equipotential points $g$ and $g'$ of the potentiometers 1 and 1'.

If the lever 3 is displaced, for instance, onto the contact $c$, a potential gradient immediately arises from $g'$ to $c$, that is, at the terminals of the polarized relay 17 a voltage arises which causes this relay to make contact e. g. at 18. Thereby, the coil of the relay 11 and the series resistance 22 are short-circuited, so that the mains voltage now flows from the positive conductor through the supply lead 20, the coil of the relay 10, the contact 18, the coils of the relays 12 and 15, the junction 23, and the lead 24 to the negative conductor. The current has now increased to such an extent that the relays 10, 12 and 15 attract their armatures. Therefore, at the moment when the polarized relay has established contact at 18, the short-circuiting of the armature 7 of the control motor has been removed by the dropping-off of the armature of the short-circuiting relay 11, while, on the other hand, the relays 10, 12 and 15 have switched-in the control motor itself. A current now flows from the positive conductor through the lead 20, the series resistance 9, the armature of the relay 10, the armature 7 of the control motor, the armature of the relay 12, through the field winding 8 in the direction from left to right, the armature of the relay 15, and the lead 24 to the negative conductor. The motor starts running, for instance, in the direction of the arrow. In this case, it moves the lever 3' downward through the gear 5, 6 until this lever has reached the contact $c'$. At this moment, the motor instantaneously stops. $c$ and $c'$ represent equipotential points, that is, the compensating current in the line 16 ceases to flow, the polarized relay 17 breaks the contact at 18, and before the relays 10, 12 and 15 drop off, the differently timed relay 11 has already attracted its armature and short-circuited the armature 7 of the motor. Thereby, the motor instantaneously stops, since this short-circuit has taken place not only with a normally-excited field, but even with an over-excited field. By the short-circuiting of the armature 7, the resistance of the motor circuit has been reduced, which results in a correspondingly greater current intensity in the motor circuit and, therefore, in the field winding 8.

Experiments have shown that the control motor in this circuit stops dead in a fraction of a revolution, even if its normal speed is above 1,000 revolutions.

The lever 3' also follows the lever 3 in the same way if the latter is displaced upwards. In this case, the current in the connecting line 16 flows from 4 to 4', the polarized relay 17 responding in such a manner that contact is established at 19. Thereby, the short-circuiting relay 11 opens, as before, the bridge across the control motor armature 7. The relay 10 also attracts its armature. However, since the series resistance 25 is bridged-over this time, the relays 14 and 13 respond, that is, the direction of the current in the field winding 8 is, this time, from right to left, so that the control motor runs in the opposite direction to its previous direction, that is, against the direction of the arrow, whereby the contact lever 3' is moved upwards.

It is thus possible from the station A to allow the switching lever 3' at the station B to assume at will a considerable number of different positions, provided that a corresponding equal number of positions and, therefore, tappings of the potentiometer is also provided at A. If the control relays are constructed in the manner indicated, not only an almost simultaneous movement of the levers 3 and 3' takes place, but it is also positively ensured that the lever 3' of the receiver will stop with almost mathematical accuracy at the predetermined position. The inaccuracy in the adjustment of the contact lever 3' at the receiver end as well as the disturbing hunting hitherto observed are therefore entirely removed.

The remote selector circuit has numerous practical applications where remote control of objects is desired. If, for instance, several advertising pictures on the same advertising board of a roof advertisement are to be remotely-controlled, the different pictures can be arranged as desired by means of such a transmitter and receiver arrangement, and the lever 3' can initiate the particular switching operations through a suitable device. Other applications are to the remote control of rudder motors for craft and of armoured turrets and the like.

Instead of the selector lever 3, any other well-known selector arrangement, for instance, with contact buttons or plugs, slide-rails, rollers, drums or the like, may be employed. It is only necessary that the voltage division at the transmitter corresponds to that at the receiver.

The drawing illustrates, for better understanding, only the simplest construction of the potentiometers and contact paths. Of course, it is advisable to choose contact paths with resilient contact movements.

What I claim is:

1. An electric remote and selective control system, comprising a potentiometer at the controlling end of the circuit, a potentiometer of similar electrical characteristics at the controlled end of the circuit, a compensating circuit connecting said potentiometers, a control motor having a field winding, said motor controlling a circuit joining switch arms connected to said potentiometers, relay means for controlling the short circuiting of the armature of said control motor, relay means controlled by said compensating circuit, for controlling the field circuit and armature circuit of said control motor, said first-mentioned relay means being timed differently from said latter relay means, whereby the field circuit of said control motor is maintained in energized condition while the armature is first short circuited and thereafter the field circuit and armature circuit are opened by said second-mentioned relay means to effect a quick stoppage of the control motor responsive to the movement of the switch arm of the potentiometer at the controlling end of the system.

2. An electric remote and selective control system according to claim 1, in which the kinetic energy of the moving parts of the control motor is utilized by the short circuiting of the armature of said control motor, which occurs before the opening of the circuit of the field of said control motor, under simultaneous strengthening of the field of said control motor.

LOUIS EUGÈNE WIDOLT
MONTROSE-OSTER.